(12) United States Patent
Ren

(10) Patent No.: US 11,438,674 B2
(45) Date of Patent: Sep. 6, 2022

(54) METHOD FOR PLAYING VIDEO, ELECTRONIC DEVICE, AND STORAGE MEDIUM

(71) Applicant: Beijing Dajia Internet Information Technology Co, Ltd., Beijing (CN)

(72) Inventor: Jiarui Ren, Beijing (CN)

(73) Assignee: BEIJING DAJIA INTERNET INFORMATION TECH. CO, LTD., Beijing (CN)

( * ) Notice: Subject to any disclaimer, the term of this patent is extended or adjusted under 35 U.S.C. 154(b) by 0 days.

(21) Appl. No.: 16/918,826

(22) Filed: Jul. 1, 2020

(65) Prior Publication Data
US 2021/0006872 A1   Jan. 7, 2021

(30) Foreign Application Priority Data
Jul. 1, 2019  (CN) .......................... 201910584736.0

(51) Int. Cl.
G06F 3/00        (2006.01)
G06F 13/00       (2006.01)
H04N 5/445       (2011.01)
H04N 21/8541     (2011.01)
H04N 21/8545     (2011.01)
H04N 21/858      (2011.01)

(52) U.S. Cl.
CPC ..... *H04N 21/8541* (2013.01); *H04N 21/8545* (2013.01); *H04N 21/8583* (2013.01)

(58) Field of Classification Search
CPC ........... H04N 21/8541; H04N 21/8545; H04N 21/8583
See application file for complete search history.

(56) References Cited

U.S. PATENT DOCUMENTS 9,082,092 B1* 7/2015 Henry .................. G11B 27/102
2007/0099684 A1* 5/2007 Butterworth ......... G11B 27/105
                                                463/1
2007/0143493 A1* 6/2007 Mullig .................... G06F 16/40
                                                709/232

(Continued)

FOREIGN PATENT DOCUMENTS

CN    107948751 A    4/2018
CN    108156179 A    6/2018
(Continued)

OTHER PUBLICATIONS

First Office Action of Chinese Patent Application No. 201910584736.0—17 pages (dated Jan. 27, 2021).

*Primary Examiner* — Kyu Chae
(74) *Attorney, Agent, or Firm* — Knobbe Martens Olson & Bear LLP

(57) ABSTRACT

A method for playing a video includes: playing a first video; displaying a first plot development selection interface in response to end of playing of the first video, wherein the first plot development selection interface includes a first plot prompt message including a plurality of prompt messages, each prompt message corresponding to a plot development direction of the first video; determining a target prompt message, wherein the target prompt message includes the prompt message selected on the first plot development selection interface; and acquiring a second video based on the target prompt message; and playing the second video.

11 Claims, 9 Drawing Sheets

(56) References Cited

U.S. PATENT DOCUMENTS

| | | | | |
|---|---|---|---|---|
| 2014/0149867 A1* | 5/2014 | McCaddon | ............ | A63F 13/335 |
| | | | | 715/723 |
| 2016/0259503 A1* | 9/2016 | Kitch | ........................ | G09B 5/02 |
| 2019/0321726 A1* | 10/2019 | Sack | ........................ | G06Q 50/10 |
| 2020/0037048 A1* | 1/2020 | Cheung | .............. | H04N 21/4758 |
| 2020/0112772 A1* | 4/2020 | Kingori | .............. | H04N 21/8456 |

FOREIGN PATENT DOCUMENTS

| | | |
|---|---|---|
| CN | 108156523 A | 6/2018 |
| CN | 109788350 A | 5/2019 |
| EP | 3684062 A1 | 7/2020 |
| WO | 2019052306 A1 | 3/2019 |

\* cited by examiner

METHOD FOR PLAYING VIDEO, ELECTRONIC DEVICE, AND STORAGE MEDIUM

This application is based on and claims priority under 35 U.S.C 119 to Patent Application No. 201910584736.0, filed in the National Intellectual Property Administration, PRC on Jul. 1, 2019, the contents of which are herein incorporated by reference in their entireties.

TECHNICAL FIELD

The present disclosure relates to field of computer technologies, and in particular, to a method for playing a video, an electronic device, and a storage medium.

BACKGROUND

Users view short videos by a video client installed on a user terminal. Generally, the user terminal includes a mobile terminal and a personal computer (PC), and the video client is a client with functions of viewing and producing the short videos. The short videos are also called short film videos, and the playback time length varies from a few seconds to a few minutes. For example, under normal circumstances, the time length of the short videos is within 5 minutes. Currently, the short video viewing users are supported to interact with short video production users by the methods of commenting, giving a like, or the like. However, the commenting, giving a like, and the like are all conventional interaction methods, and are relatively simple.

SUMMARY

Embodiments of the present disclosure provide a method for playing a video, an electronic device, and a storage medium. The technical solutions of the present disclosure are as follows.

According to an aspect of embodiments of the preset disclosure, a method for playing a video is provided. The method is applicable to an electronic device. The method includes: playing a first video; displaying a first plot development selection interface in response to end of playing of the first video, wherein the first plot development selection interface includes a first plot prompt message including a plurality of prompt messages, each prompt message corresponding to a plot development direction of the first video; determining a target prompt message, wherein the target prompt message includes the prompt message selected on the first plot development selection interface; and acquiring a second video based on the target prompt message; and playing the second video.

According to another aspect of embodiments of the present disclosure, an electronic device is provided. The electronic device includes a processor, a communication interface, a memory, and a communication bus; wherein the processor, the communication interface, and the memory communicate with each other by the communication bus. The memory is configured to store a computer program. The processor, when running the computer program stored on the computer program, is enabled to perform the following steps: playing a first video; displaying a first plot development selection interface in response to end of playing of the first video, wherein the first plot development selection interface includes a first plot prompt message including a plurality of prompt messages, each prompt message corresponding to a plot development direction of the first video; determining a target prompt message, wherein the target prompt message includes the prompt message selected on the first plot development selection interface; and acquiring a second video based on the target prompt message; and playing the second video.

According to yet another aspect of embodiments of the present disclosure, a computer-readable storage medium is provided. A computer program is stored in the computer-readable storage medium. The computer program, when run by a processor, enables the processor to perform the following steps: playing a first video; displaying a first plot development selection interface in response to end of playing of the first video, wherein the first plot development selection interface includes a first plot prompt message including a plurality of prompt messages, each prompt message corresponding to a plot development direction of the first video; determining a target prompt message, wherein the target prompt message includes the prompt message selected on the first plot development selection interface; and acquiring a second video based on the target prompt message; and playing the second video.

According to still a further aspect of the present disclosure, a computer program product or a computer program including at least one instruction is provided. The computer program product or the computer program, when run on an electronic device, enables the electronic device to perform the following steps: playing a first video; displaying a first plot development selection interface in response to end of playing of the first video, wherein the first plot development selection interface includes a first plot prompt message including a plurality of prompt messages, each prompt message corresponding to a plot development direction of the first video; determining a target prompt message, wherein the target prompt message includes the prompt message selected on the first plot development selection interface; and acquiring a second video based on the target prompt message; and playing the second video.

BRIEF DESCRIPTION OF THE DRAWINGS

The accompanying drawings here incorporated in the description and forming a part thereof illustrate the embodiments of the present disclosure and are used to explain the principle of the present disclosure along therewith, without constituting a limitation on the present disclosure.

DETAILED DESCRIPTION

In order to enable a person of ordinary skill in the art to better understand the technical solutions in the present disclosure, the technical solutions in the embodiments of the present disclosure will be clearly and completely described below in conjunction with the accompanying drawings.

It should be noted that the terms "first", "second", and the like in the description and claims of the present disclosure and the above accompanying drawings are used to distinguish similar objects, without necessarily describing a specific order or sequence. It should be understood that the data used in this way can be interchanged under appropriate circumstances, such that the embodiments of the present disclosure described herein can be implemented in an order other than those illustrated or described herein. The implementations set forth in the following description of exemplary embodiments do not represent all implementations consistent with the present disclosure. Instead, they are merely examples of apparatuses and methods consistent with aspects related to the present disclosure as recited in the appended claims.

The user information involved in the present disclosure is the information authorized by users or fully authorized by parties.

The embodiment of the present disclosure provides a method for playing a video, which is applied to an electronic device. After playing of a current video ends, the electronic device will display a plot development selection interface, wherein the plot development selection interface contains a plot prompt message, the plot prompt message includes a plurality of prompt messages, and each prompt message is intended to indicate a plot development direction corresponding to the video of which the playing ends at present. Afterwards, if the user selects the target prompt message in the plot development selection interface, the electronic device acquires another video based on the target prompt message and plays the video corresponding to the target prompt message. According to the embodiment of the present disclosure, when the user views the video, the user can continue to select the trend of the video plot that the user desires to view after playing of the current video ends according to the plot prompt message displayed on the plot development selection interface.

In some embodiments, the electronic device includes a mobile terminal or a PC with video playing and video production functions. In some embodiments, the above mobile terminal includes: a smartphone, a smart watch, a portable computer, a moving picture experts group audio layer III (MP3) player, a moving picture experts group audio layer IV (MP4) player, a laptop, and the like.

Figure 1:
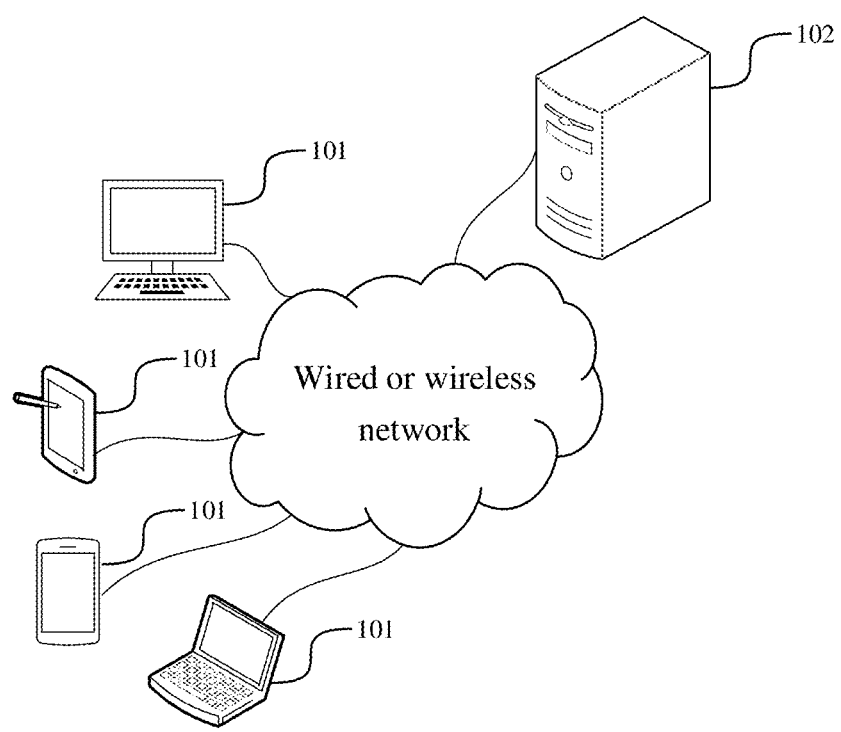
FIG. 1 is a schematic diagram of an implementation environment where a method for playing a method according to an embodiment of the present disclosure is involved.

In some embodiments, referring to FIG. 1, the implementation environment wherein the method for playing a video is involved includes: an electronic device 101 and a server 102. In some embodiments, the electronic device 101 is connected to the server 102 over a wireless network or a wired network. In some embodiments, the server 102 is also referred to as a video client sharing platform.

In some embodiments, the video client is installed and operates on the electronic device 101, and the video client is configured to log in an account of a video production user or an account of a video viewing user. If the account of the video production user is logged in the video client, the electronic device 101 uploads the well-produced video to the server 102 by the video client. If the account of the video viewing user is logged in the video client, the electronic device 101 acquires a video from the server 102 by the video client for rendering and playing.

In addition, the above electronic device 101 generally refers to one of a plurality of electronic devices, and the present embodiment only uses the electronic device 101 as an example for illustration. Those skilled in the art could know that the number of the above electronic devices may be more or less. For example, only a few above electronic devices 101 may be provided, or dozens or hundreds of or more electronic devices 101 may be provided. The embodiment of the present disclosure does not limit the number of the electronic devices 101 and the device types. In addition, the server 102 is at least one of a server, a plurality of servers, a cloud computing platform, and a virtualization center, which is not limited in the embodiments of the present disclosure.

The above played and produced video is a long video or a short video. In some embodiments, the long video and the short video are distinguished by the length of playback time. For example, the video shorter than a time length is a short video, and the video longer than a time length is a long video. In some embodiments, the long video and the short video are distinguished by the size of an occupied storage space. For example, the video smaller than a storage capacity is a short video, and the video larger than a storage capacity is a long video.

By taking the short video as an example, the short video production user produces the short video by a user terminal. After producing the short video, the well-produced short video is posted to the video client sharing platform by the video client, such that the short video viewing user views the short video produced by the short video production user by the video client.

Figure 2:
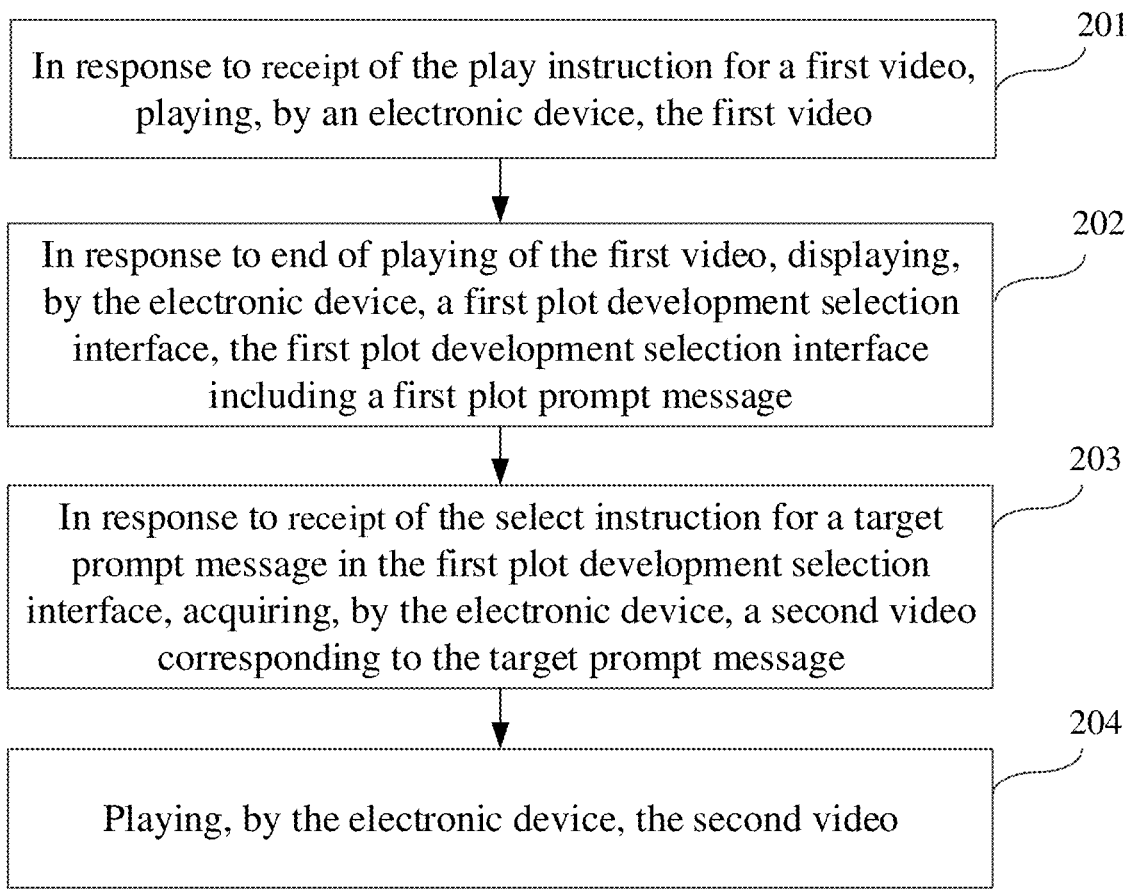
FIG. 2 is a flowchart of a method for playing a video according to an embodiment of the present disclosure.

The method for playing a video according to the embodiment of the present disclosure will be described in detail below in conjunction with specific implementation manners. The embodiment of the present disclosure takes the short video as an example of the video for illustration. In addition, the video involved in the embodiment of the present disclosure may also be a long video, that is, the video of any length is applicable to the embodiment of the present disclosure, as shown in FIG. 2, the steps are as follows:

In step 201, in response to receipt of the play instruction for a first video, the electronic device plays the first video.

In some embodiments, the first video refers to a short video in the embodiment of the present disclosure, that is, the first video is also referred to as a first short video.

In some embodiments, the short video viewing user selects a short video (that is, the first short video) to be viewed by a video client installed on the electronic device, and accordingly, the electronic device receives the play instruction for the first short video and then plays the first short video.

The short video is also called a short film video, which refers to a video with a short time length. The playback time length of the short video varies from a few seconds to a few minutes. For example, under normal circumstances, the time length of the short video is within 5 minutes.

In addition, the short video generally refers to a high-frequency pushed video content suitable for viewing in a mobile state and a short-term leisure state. In some embodiments, the short video covers the topics such as skill sharing, humor and fun, fashion trends, social hot spots, street interviews, public welfare education, advertising creativity and commercial customization, which is not limited by the present embodiment of the present disclosure.

In some embodiments, upon receipt of the play instruction for the first short video, the electronic device performs the following steps before playing the first short video.

In step 1, the electronic device sends a request for playing the first short video to a server in response to receipt of the play instruction for the first short video.

In the embodiment of the present disclosure, both the first short video and videos related to the first short video may be stored in the server. Upon receipt of the instruction of playing the first short video, the electronic device sends the request for playing the first short video to the server.

In some embodiments, the videos related to the first short video are videos related to the first short video in the plot development direction. For example, these videos are configured to embody the plot development after the first video, that is, these videos belong to the videos after the first video in the plot development.

In step 2, the electronic device receives the first short video and a first plot prompt message corresponding to the first short video.

In the embodiment of the present disclosure, after the server receives the request for playing the first short video, the server sends the first short video and the first plot prompt message corresponding to the first short video to the electronic device. When the electronic device receives the first short video and the first plot prompt message corresponding to the first short video, the first short video is played.

In some embodiments, the first plot prompt message includes a plurality of prompt messages, and each prompt message is intended to indicate a plot development direction corresponding to the first short video. For example, the prompt message is a title of the short video. In some embodiments, the prompt message is displayed in the form of a button, and the short video viewing user taps the button containing the prompt message by the electronic device to view the short video of the plot development direction indicated by the prompt message.

In step 202, in response to end of playing of the first video, the electronic device displays a first plot development selection interface, the first plot development selection interface including the first plot prompt message.

In some embodiments, when playing of the first short video ends, the electronic device displays the first plot development selection interface. The first plot development selection interface contains the prompt message corresponding to the first short video.

In some embodiments, by taking "a movie clip of a fight between Captain America and Iron Man" as an example of the title of the short video currently played by the electronic device, when playing of the short video ends, the electronic device pops up the plot development selection interface in the playing interface. In some embodiments, the title of the plot development selection interface is "Who do you want to win?", and the interface includes a prompt message A and a prompt message B. In some embodiments, the prompt message A is "view the ending that Captain America wins", and the prompt message B is "view the ending that Iron Man wins". If the short video viewing user selects the prompt message A, then the short video "the ending that Captain America wins" is viewed. If the short video viewing user selects the prompt message B, then the short video "the ending that Iron Man wins" is viewed. In this way, after viewing the short video "a movie clip of a fight between Captain America and Iron Man", the short video viewing user selects the ending that the user desires to view according to the prompt message in the plot development selection interface, thereby increasing the fun of viewing.

The first plot development selection interface further includes a title message corresponding to the first short video.

In step 203, in response to receipt of the select instruction for a target prompt message in the first plot development selection interface, the electronic device acquires a second video corresponding to the target prompt message.

In some embodiments, the second video refers to a short video in the embodiment of the present disclosure, that is, the second video is also referred to as a second short video. Correspondingly, the third short video and the fourth short video appearing hereinafter are also referred to as a third video and a fourth video. The target prompt message is the prompt message selected by the user on the first plot development selection interface.

In the embodiment of the present disclosure, the short video viewing user selects the prompt message (that is, the target prompt message) of a plot development direction that the user desires to view in the first plot development selection interface. Upon receipt of the select instruction for the target prompt message, the electronic device acquires the second short video corresponding to the target prompt message.

In some embodiments, the electronic device stores the corresponding relationship between the target prompt message and the second short video. Upon receipt of the select instruction for the target prompt message, the electronic device requests the second short video from the server according to the locally stored corresponding relationship. Then the second short video is acquired.

In other embodiments, the server stores the corresponding relationship between the target prompt message and the second short video. When the electronic device receives the select instruction for the target prompt message, the electronic device sends an identifier carried by the target prompt message to the server. The server can determine the second short video corresponding to the target prompt message according to the identifier, and send the second short video to the electronic device, such that the electronic device acquires the second short video.

In step 204, the electronic device plays the second video.

In the embodiment of the present disclosure, upon receipt of the second short video, the electronic device plays the second short video.

In some embodiments, the electronic device also displays a second plot development selection interface after playing of the second short video ends.

The second plot development selection interface contains a second plot prompt message. The second plot prompt message includes a plurality of prompt messages, and each prompt message is intended to indicate a plot development direction of the second short video. In addition, the second plot development selection interface further includes a title message corresponding to the second short video.

In the embodiment of the present disclosure, when playing of the second short video ends, the electronic device displays the second plot prompt message. If there is still a subsequent plot after playing of the second short video ends, the short video viewing user can continue to select the plot development direction that the user desires to view in the second plot development selection interface until the end of the plot is viewed.

In some embodiments, the embodiment of the present disclosure also provides a process of producing a short video, which includes the following steps:

In step 1, upon receipt of a video production instruction, the electronic device displays a short video production interface.

In the embodiment of the present disclosure, the short video production user can produce the short video by a video client installed on the electronic device. When the electronic device receives the short video production instruction, the electronic device displays the short video production interface. The short video production interface is an interface in the video client. The short video production user produces the short video in the interface. The short video produced by the short video production user can be uploaded to the server by the video client. The short video production user per se or the short video viewing user can play the short video by the video client.

Figure 3A:
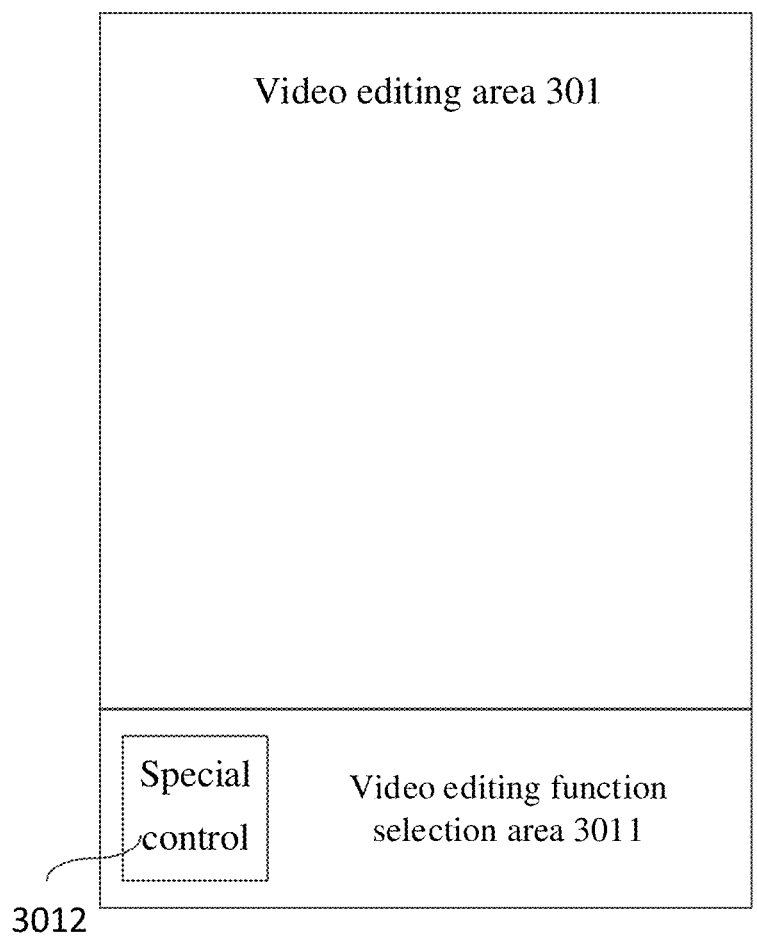
FIG. 3a is a schematic diagram of a video production interface according to an embodiment of the present disclosure.
Figure 3B:
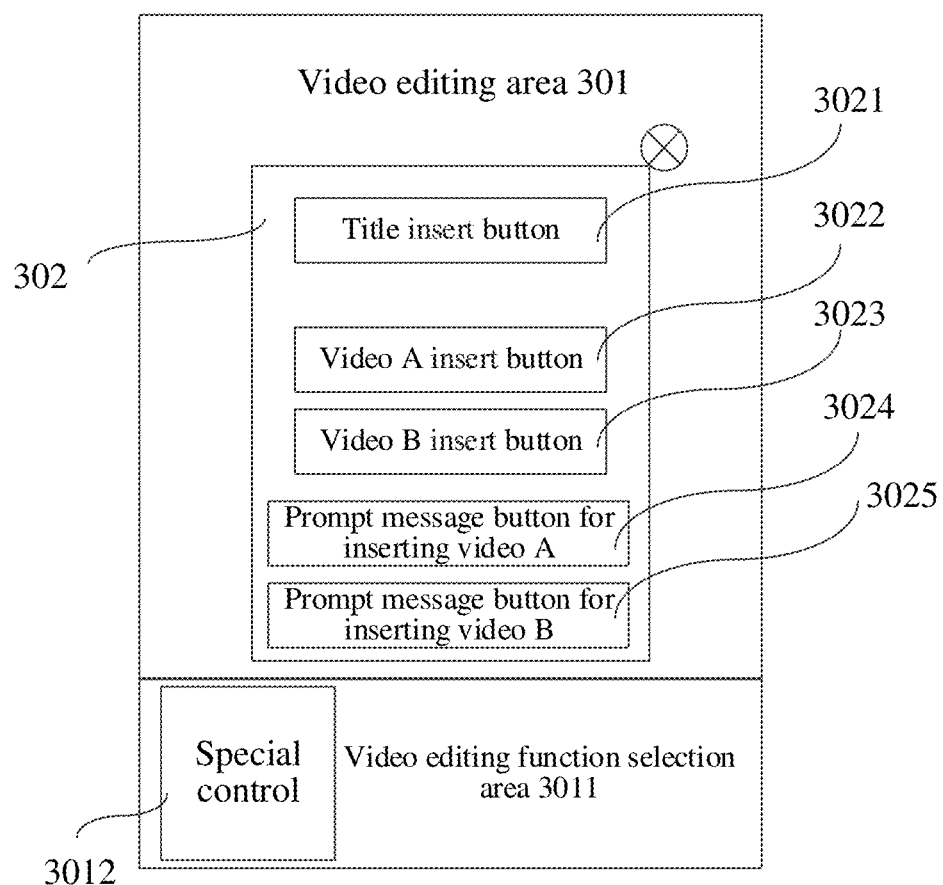
FIG. 3b is a schematic diagram of a video production interface according to an embodiment of the present disclosure.

As shown in FIG. 3a and FIG. 3b, the embodiment of the present disclosure provides a schematic diagram of a short video protection interface. The interface includes: a video editing area 301 in FIG. 3a, and the video editing area 301, a video editing function selection area 3011, a special control 3012, and a plot development selection window 302 which are in FIG. 3b. When the electronic device receives a short video production instruction, the electronic device displays the interface shown in FIG. 3a. The video editing area 301 includes the video editing function selection area 3011 and the special control 3012. When the short video production user taps the special control 3012, the electronic device displays the interface shown in FIG. 3b. The plot development setting interface shown in FIG. 3b includes the plot development selection window 302, and the plot development selection window 302 includes a title insert button 3021, a video A insert button 3022 and a video B insert button 3023. In some embodiments, the short video production user inserts the title by tapping the title insert button 3021, inserts a video A or video B by tapping the video A insert button 3022 or the video B insert button 3023, and can also insert the prompt message of the video A or video B. That is, the plot development selection window 302 also includes a prompt message insert button, for example, a prompt message button 3024 for inserting the video A, and a prompt message button 3025 for inserting the video B.

As shown in FIG. 3a and FIG. 3b, the short video production user can insert more than one short video by the plot development setting interface when producing the short video by the electronic device.

In step 2, the electronic device acquires a third short video selected by the short video production user by the video production interface as a basic short video.

In some embodiments, the electronic device acquires the third short video selected by the short video production user by the video production interface as the basic short video. As shown in FIG. 3a and FIG. 3b, the basic short video is a short video that is inserted by the user by the "video editing function selection area".

In step 3, upon receipt of the plot development setting instruction, the electronic device displays the plot development setting interface.

In some embodiments, upon receipt of the select instruction for the special control input by the short video production user, the electronic device displays the plot development setting interface, and inserts the first prompt message corresponding to the third short video by the plot development setting interface. As shown in FIG. 3b, the plot development setting interface also includes the plot development selection window 302, and the short video production user can insert the first prompt message in such window, and tapping to select the short video to be inserted by the user (the fourth short video).

In step 4, the electronic device receives the first prompt message input by the short video production user in the plot development setting interface and the fourth short video corresponding to the first prompt message, and establishes a corresponding relationship between the third short video and the first prompt message, as well as a corresponding relationship between the fourth short video and the first prompt message.

In some embodiments, the fourth short video is a subsequent plot development of the third short video, that is, after playing of the third short video ends, the subsequent plot develops into the fourth short video.

In some embodiments, receiving the first prompt message input by the short video production user in the plot development setting interface and the fourth video corresponding to the first prompt message includes: displaying, by the electronic device, a plot development selection window in the plot development setting interface; wherein the plot development selection window includes a video insert button and a prompt message insert button; upon receipt of a select instruction for the prompt message insert button input by the short video production user, receiving the first prompt message input by the short video production user; and upon receipt of a select instruction for the video insert button input by the short video production user, receiving a fourth video corresponding to the first prompt message. In addition, the plot development selection window further includes a title insert button. Upon receipt of a select instruction for the title insert button input by the short video production user, the electronic device receives the title message corresponding to the third video input by the short video production user.

In the embodiment of the present disclosure, the electronic device determines the corresponding relationship between the third short video and the first prompt message, and the corresponding relationship between the fourth short video and the first prompt message. Therefore, the subsequent short video production user or short video viewing user can jump to the fourth short video by tapping the first prompt message in a short video playing interface.

Figure 4A:
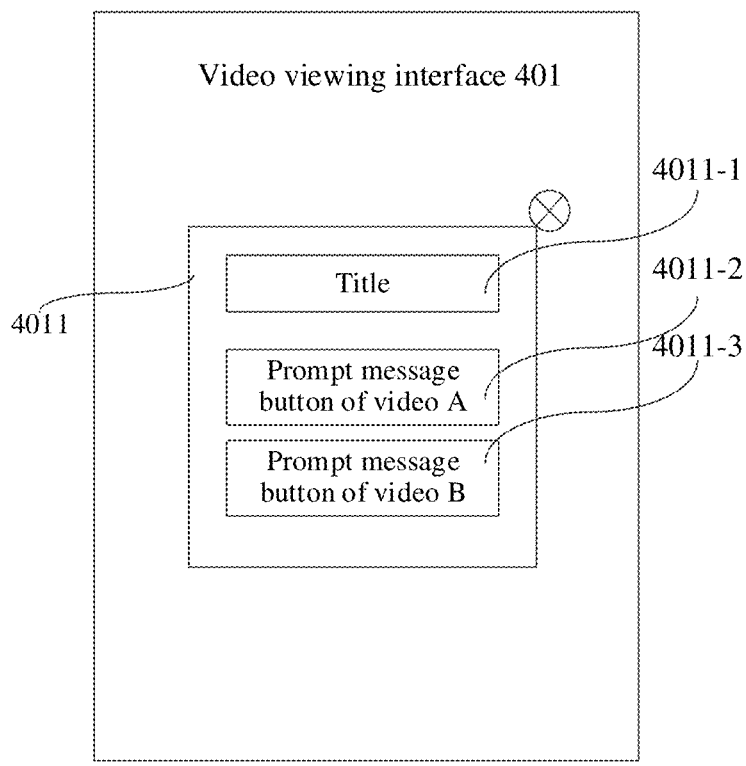
FIG. 4a is a schematic diagram of a video playing interface according to an embodiment of the present disclosure.
Figure 4B:
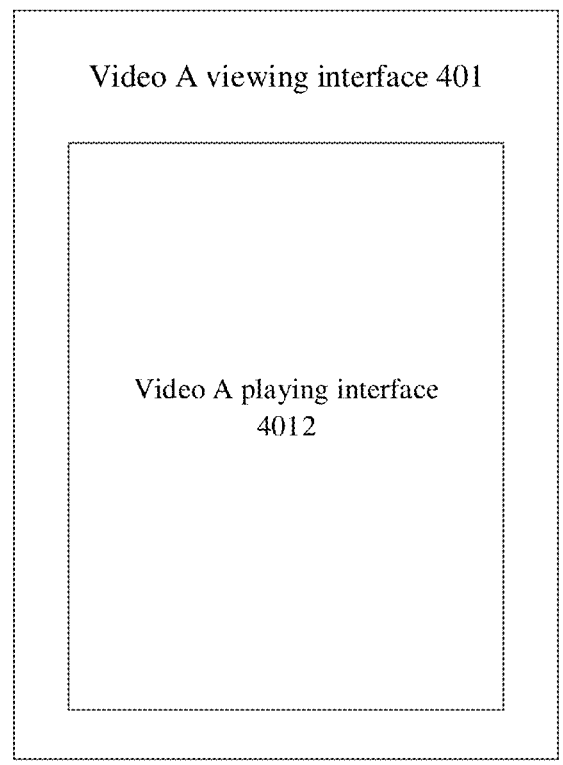
FIG. 4b is a schematic diagram of a video playing interface according to an embodiment of the present disclosure.

As shown in FIG. 4a and FIG. 4b, the embodiment of the present disclosure provides a schematic diagram of the short video playing interface. The interface shown in FIG. 4a includes a video viewing interface 401 and a plot development selection interface 4011, and the interface shown in FIG. 4b includes a video A viewing interface 402 and a video A playing interface 4021 located in the video A viewing interface 402. When playing of the short video by the electronic device ends, as shown in FIG. 4a, in some embodiments, the electronic device displays the plot development selection interface 4011 in the video viewing interface 401, and the plot development selection interface 4011 includes a title button 4011-1, a prompt message button 4011-2 of the video A and a prompt message button 4011-3 of the video B. When the short video production user taps the prompt message button 4011-2 of the video A by the electronic device, the electronic device can play the video A according to the corresponding relationship between the button and the video A, that is, switch to the interface shown in FIG. 4b. In FIG. 4b, a video A playing interface 4012 contains data of the video A, which is not specifically shown in the embodiment of the present disclosure.

In some embodiments, the short video production user uploads the produced short video to the server, such that the short video viewing user can view the short video. The processing procedure is as follows: the electronic device uploads the third short video, the first prompt message, the corresponding relationship between the third short video and the first prompt message and the fourth short video corresponding to the first prompt message to the server, such that the server stores the third short video, the first prompt message, and the fourth short video, establishes the corresponding relationship between the third short video and the first prompt message, and establishes the corresponding relationship between the first prompt message and the fourth short video.

In some embodiments, after the electronic device determines the corresponding relationship between the fourth short video and the first prompt message, the third short video, the fourth short video, the first prompt message, the corresponding relationship between the third short video and the first prompt message and the corresponding relationship between the fourth short video and the first prompt message are uploaded to the server. The third short video is the short video viewed by the short video viewing user at first. When the viewing of the third short video by the short video viewing user ends, the user can select the plot development direction that the user desires to view next according to the first prompt message. If the short video viewing user selects the first prompt message, the electronic device determines the fourth short video according to the corresponding relationship between the fourth short video and the first prompt message, and plays the fourth short video.

In some embodiments, the third short video, the fourth short video, the first prompt message, the corresponding relationship between the third short video and the first prompt message, and the corresponding relationship between the fourth short video and the first prompt message are uploaded to the server by the electronic device over the Internet, such that all short video viewing users can view the third short video, and all subsequent plot developments of the third short video (in the embodiment of the present disclosure, the subsequent plot development is the fourth short video) by the video client.

In some embodiments, the third video in the above video production process is the first video in the video playing process, and the fourth video in the above video production process is the second video in the video playing process. The target prompt message in the above video playing process is correspondingly the first prompt message in the video production process.

In addition to the fourth video, the above steps may also be taken to associate a plurality of videos with the third video, that is, the third video may correspond to a plurality of prompt messages, and each of these prompt messages is intended to indicate a plot development direction of the third video.

Figure 5:
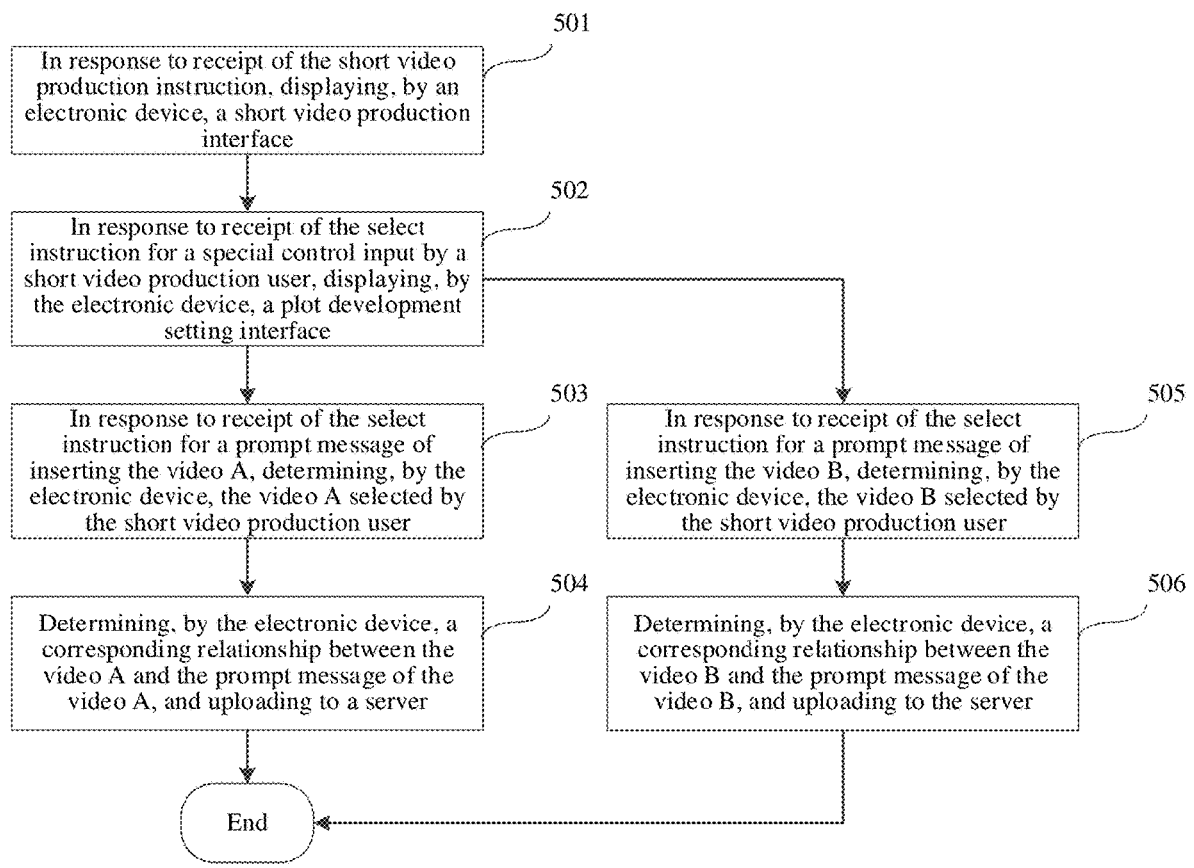
FIG. 5 is a flowchart of a method for producing a video according to an embodiment of the present disclosure.

As shown in FIG. 5, FIG. 5 shows an example of a method for producing a video according to an embodiment of the present disclosure, which includes the following steps:

In step 501, in response to receipt of the production instruction for the short video, the electronic device displays a short video production interface.

In step 502, in response to receipt of the select instruction for a special control input by the short video production user, the electronic device displays a plot development setting interface. After step 502 is performed, either step 503 or step 505 may be performed.

In step 503, in response to receipt of the select instruction for a prompt message of inserting the video A, the electronic device determines the video A selected by the short video production user.

In some embodiments, the prompt message here is in the form of a button.

In step 504, the electronic device determines a corresponding relationship between the video A and the prompt message of the video A, and uploads to the server.

In step 505, in response to receipt of the select instruction for a prompt message of inserting the video B, the electronic device determines the video B selected by the short video production user.

In step 506, the electronic device determines a corresponding relationship between the video B and the prompt message of the video B, and uploads to the server.

Figure 6:
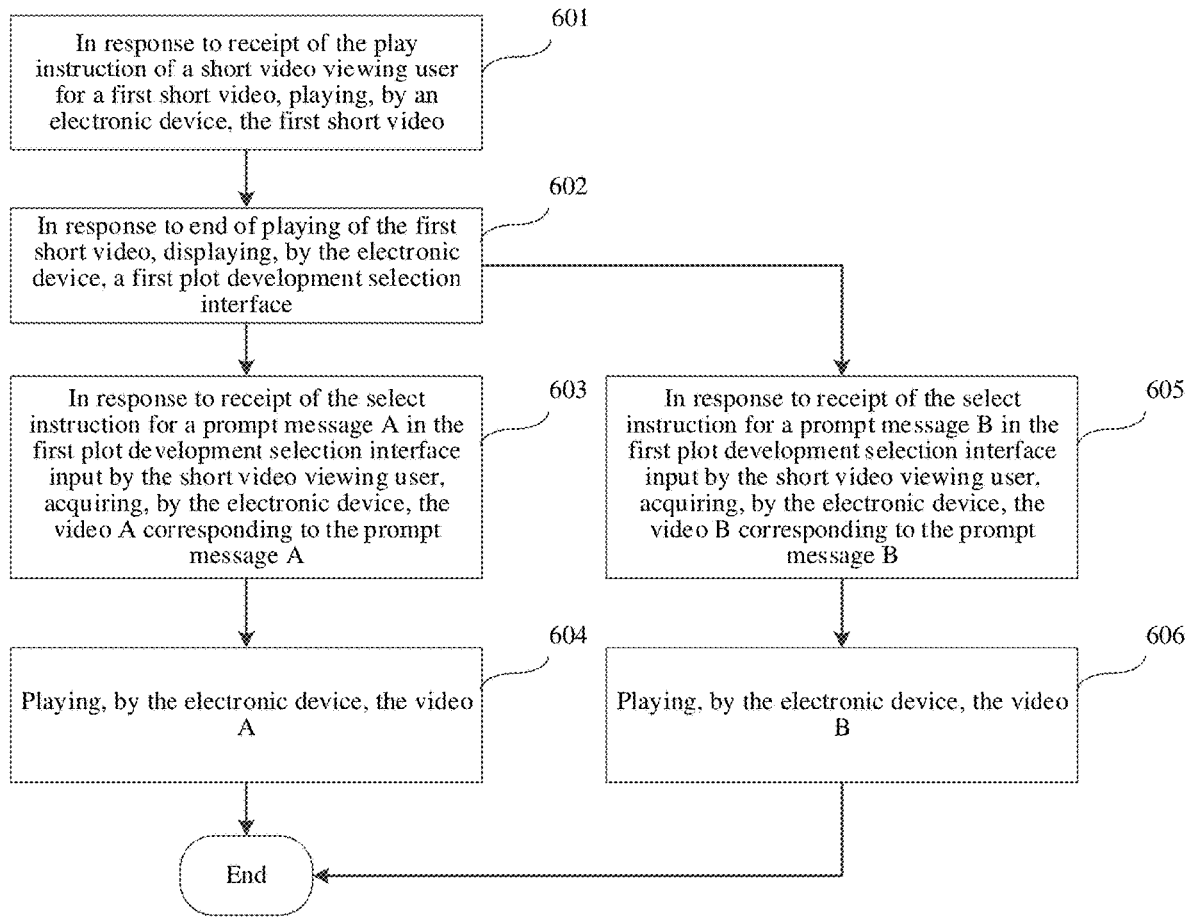
FIG. 6 is a flowchart of a method for playing a video according to an embodiment of the present disclosure.

As shown in FIG. 6, FIG. 6 shows an example of another method for playing a video according to an embodiment of the present disclosure, including the following steps:

In step 601, in response to receipt of the play instruction of the short video viewing user for a first short video, the electronic device plays the first short video.

In step 602, in response to end of playing of the first short video, the electronic device displays a first plot development selection interface. After step 602 is performed, either step 603 or step 605 may be performed.

In step 603, in response to receipt of the select instruction for a prompt message A in the first plot development selection interface input by the short video viewing user, the electronic device acquires the video A corresponding to the prompt message A.

In step 604, the electronic device plays the video A.

In step 605, in response to receipt of the select instruction for a prompt message B in the first plot development selection interface input by the short video viewing user, the electronic device acquires the video B corresponding to the prompt message B.

In step 606, the electronic device plays the video B.

Figure 7:
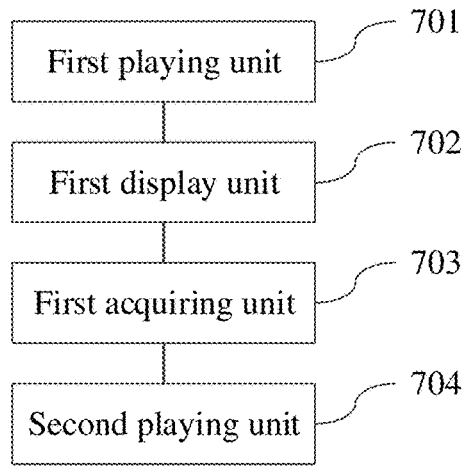
FIG. 7 is a schematic structural diagram of an apparatus for playing a video according to an embodiment of the present disclosure.

Based on the same technical concept, the embodiment of the present disclosure also provides an apparatus for playing a video. As shown in FIG. 7, the apparatus includes:

a first playing unit 701, configured to play a first video;

a first display unit 702, configured to display a first plot development selection interface in response to end of playing of the first video; wherein the first plot development selection interface includes a first plot prompt message, including a plurality of prompt messages, each prompt message corresponding to a plot development direction of the first video;

a first acquiring unit 703, configured to determine a target prompt message, the target prompt message being the prompt message selected on the first plot development selection interface; and acquire a second video based on the target prompt message; and a second playing unit 704, configured to play the second video.

Figure 8:
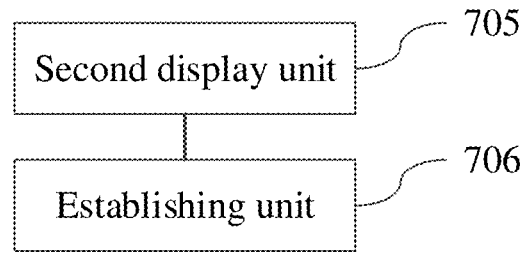
FIG. 8 is a schematic structural diagram of an apparatus for playing a video according to an embodiment of the present disclosure.

In some embodiments, as shown in FIG. 8, the apparatus further includes:

a second display unit 705, configured to display the plot development setting interface of the first video; and an establishing unit 706, configured to receive the target prompt message input in the plot development setting interface and the second video; establish a corresponding relationship between the first video and the target prompt message; and establish a corresponding relationship between the second video and the target prompt message.

In some embodiments, the plot development setting interface includes a plot development selection window, and the plot development selection window includes a video insert button and a prompt message insert button.

The video insert button is configured to insert the second video corresponding to the target prompt message.

The prompt message insert button is configured to insert the target prompt message.

In some embodiments, the plot development selection window further includes a title insert button, the plot development selection window further includes a title insert button, and the title insert button is configured to insert a title message corresponding to the first video.

Figure 9:
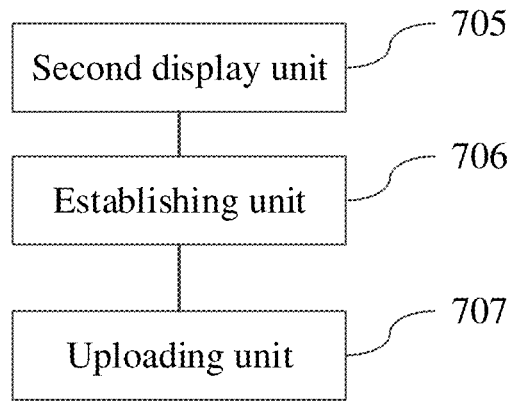
FIG. 9 is a schematic structural diagram of an apparatus for playing a video according to an embodiment of the present disclosure.

In some embodiments, as shown in FIG. 9, the apparatus further includes:

an uploading unit 707, configured to upload the first video, the target prompt message, the second video, the corresponding relationship between the first video and the target prompt message, and the corresponding relationship between the target prompt message and the second video to a server.

Figure 10:
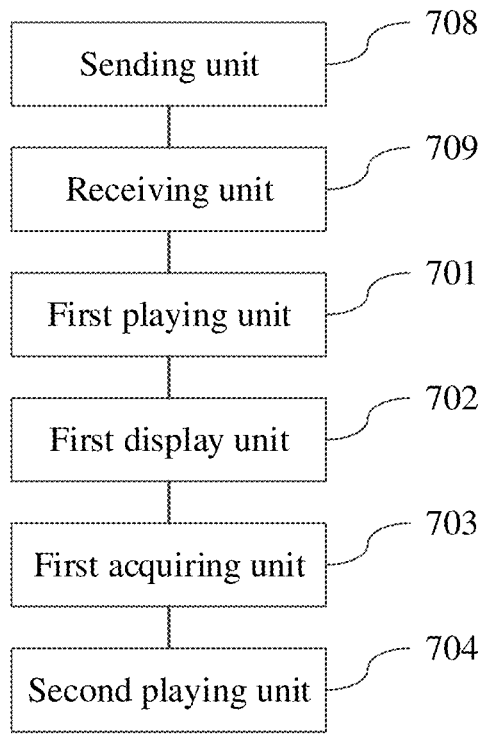
FIG. 10 is a schematic structural diagram of an apparatus for playing a video according to an embodiment of the present disclosure.

In some embodiments, as shown in FIG. 10, the apparatus further includes:

a sending unit 708, configured to send a request for playing the first video to the server in response to receipt of the play instruction for the first video; and a receiving unit 709, configured to receive the first video and the first plot prompt message corresponding to the first video.

Figure 11:
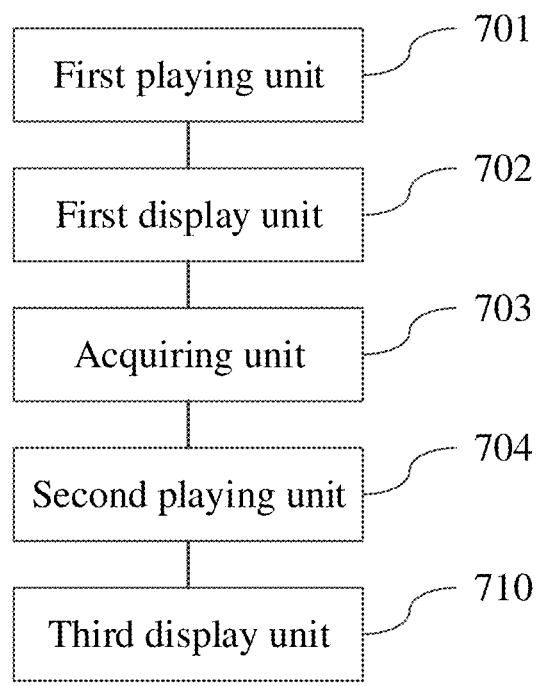
FIG. 11 is a schematic structural diagram of an apparatus for playing a video according to an embodiment of the present disclosure.

In some embodiments, as shown in FIG. 11, the apparatus further includes:

a third display unit 710, configured to display a second plot development selection interface in response to end of playing of the second video, the second plot development selection interface including a second plot prompt message; wherein the second plot prompt message includes a plurality of prompt messages, and each prompt message corresponds to a plot development direction of the second video.

In some embodiments, the first plot development selection interface further includes a title message corresponding to the first video, and the second plot development selection interface further includes a title message corresponding to the second video.

Figure 12:
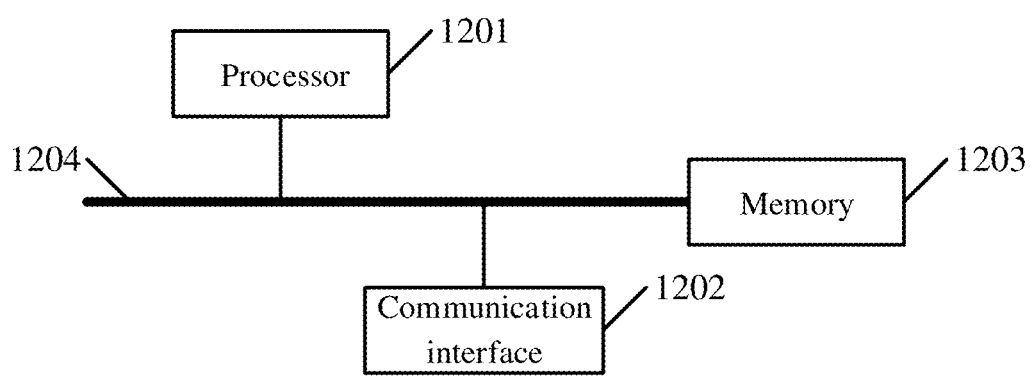
FIG. 12 is a schematic structural diagram of an electronic device according to an embodiment of the present disclosure.

An embodiment of the present disclosure also provides an electronic device, as shown in FIG. 12, including a processor 1201, a communication interface 1202, a memory 1203, and a communication bus 1204, wherein the processor 1201, the communication interface 1202, and the memory 1203 communicate with each other by the communication bus 1204.

The memory 1203 is configured to store a computer program.

The processor 1201, when running the computer program, is enabled to perform the following steps:

playing a first video;

displaying a first plot development selection interface in response to end of playing of the first video, wherein the first plot development selection interface includes a first plot prompt message including a plurality of prompt messages, each prompt message corresponding to a plot development direction of the first video;

determining a target prompt message, wherein the target prompt message includes the prompt message selected on the first plot development selection interface; and acquiring a second video based on the target prompt message; and playing the second video.

In some embodiments, the processor, when running the computer program, is enabled to perform the following steps:

displaying a plot development setting interface of the first video;

receiving the target prompt message input in the plot development setting interface and the second video;

establishing a corresponding relationship between the first video and the target prompt message; and establishing a corresponding relationship between the second video and the target prompt message.

In some embodiments, the plot development setting interface includes a plot development selection window, and the plot development selection window includes a video insert button and a prompt message insert button.

The video insert button is configured to insert the second video corresponding to the target prompt message.

The prompt message insert button is configured to insert the target prompt message.

In some embodiments, the plot development selection window further includes a title insert button, and the title insert button is configured to insert a title message corresponding to the first video.

In some embodiments, the processor, when running the computer program, is enabled to perform the following step:

uploading the first video, the target prompt message, the second video, the corresponding relationship between the first video and the target prompt message, and the corresponding relationship between the target prompt message and the second video to a server.

In some embodiments, the processor, when running the computer program, is enabled to perform the following steps:

sending a request for playing the first video to the server in response to receipt of the play instruction for the first video; and receiving the first video and the first plot prompt message corresponding to the first video.

In some embodiments, the processor, when running the computer program, is enabled to perform the following step:

displaying a second plot development selection interface in response to end of playing of the second video, wherein the second plot development selection interface includes a second plot prompt message including a plurality of prompt messages, each prompt message corresponding to a plot development direction of the second video.

In some embodiments, the first plot development selection interface further includes a title message corresponding to the first video, and the second plot development selection interface further includes a title message corresponding to the second video.

In some embodiments, the above communication bus of the network device is a peripheral component interconnect (PCI) standard bus or an extended industry standard architecture (EISA) bus, etc. In some embodiments, the communication bus is divided into an address bus, a data bus, a control bus, and so on. For ease of representation, only a thick line is used in the figure, but it does not mean that there is only one bus or one type of bus.

The communication interface is configured to facilitate the communication between the above network device and other devices.

In some embodiments, the memory includes a random access memory (RAM), and a non-volatile memory (NVM), for example, at least one disk memory. In some embodiments, the memory may also be at least one storage device located away from the above processor.

In some embodiments, the above processor may be a general processor, including a central processing unit (CPU), a network processor (NP), and the like. The processor may also be a digital signal processor (DSP), an application specific integrated circuit (ASIC), a field-programmable gate array (FPGA) or other programmable logic devices, discrete gates or transistor logic devices and discrete hardware components.

Based on the same technical concept, an embodiment of the present disclosure provides a computer-readable storage medium, wherein a computer program is stored therein. The computer program, when run by a processor, enables the processor to perform the following steps:

playing a first video;

displaying a first plot development selection interface in response to end of playing of the first video, wherein the first plot development selection interface includes a first plot prompt message including a plurality of prompt messages, each prompt message corresponding to a plot development direction of the first video;

determining a target prompt message, wherein the target prompt message includes the prompt message selected on the first plot development selection interface; and acquiring a second video based on the target prompt message; and playing the second video.

In some embodiments, the computer program, when run by the processor, enables the processor to perform the following steps:

displaying a plot development setting interface of the first video;

receiving the target prompt message input in the plot development setting interface and the second video;

establishing a corresponding relationship between the first video and the target prompt message; and establishing a corresponding relationship between the second video and the target prompt message.

In some embodiments, the plot development setting interface includes a plot development selection window, and the plot development selection window includes a video insert button and a prompt message insert button.

The video insert button is configured to insert the second video corresponding to the target prompt message.

The prompt message insert button is configured to insert the target prompt message.

In some embodiments, the plot development selection window further includes a title insert button, and the title insert button is configured to insert a title message corresponding to the first video.

In some embodiments, the computer program, when run by the processor, enables the processor to perform the following step:

uploading the first video, the target prompt message, the second video, the corresponding relationship between the first video and the target prompt message, and the corresponding relationship between the target prompt message and the second video to a server.

In some embodiments, the computer program, when run by the processor, enables the processor to perform the following steps:

sending a request for playing the first video to the server in response to receipt of the play instruction for the first video; and receiving the first video and the first plot prompt message corresponding to the first video.

In some embodiments, the computer program, when run by the processor, enables the processor to perform the following step:

displaying a second plot development selection interface in response to end of playing of the second video, wherein the second plot development selection interface includes a second plot prompt message including a plurality of prompt messages, each prompt message corresponding to a plot development direction of the second video.

In some embodiments, the first plot development selection interface further includes a title message corresponding to the first video, and the second plot development selection interface further includes a title message corresponding to the second video.

Based on the same technical concept, the embodiment of the present disclosure also provides a computer program product or a computer program including at least one instruction. The computer program product or the computer program, when running on an electronic device, enables the electronic device to perform the following steps:

playing a first video;

displaying a first plot development selection interface in response to end of playing of the first video, wherein the first plot development selection interface includes a first plot prompt message including a plurality of prompt messages, each prompt message corresponding to a plot development direction of the first video;

determining a target prompt message, wherein the target prompt message includes the prompt message selected on the first plot development selection interface; and acquiring a second video based on the target prompt message; and playing the second video.

In some embodiments, the computer program product or the computer program, when run on an electronic device, enables the electronic device to perform the following steps:

displaying a plot development setting interface of the first video;

receiving the target prompt message input in the plot development setting interface and the second video;

establishing a corresponding relationship between the first video and the target prompt message; and establishing a corresponding relationship between the second video and the target prompt message.

In some embodiments, the plot development setting interface includes a plot development selection window, wherein the plot development selection window includes a video insert button and a prompt message insert button; wherein the video insert button is configured to insert the second video corresponding to the target prompt message; and the prompt message insert button is configured to insert the target prompt message.

In some embodiments, the plot development selection window further includes a title insert button, and the title insert button is configured to insert a title message corresponding to the first video.

In some embodiments, the computer program product or the computer program, when running on an electronic device, enables the electronic device to perform the following step:

uploading the first video, the target prompt message, the second video, the corresponding relationship between the first video and the target prompt message, and the corresponding relationship between the target prompt message and the second video to a server.

In some embodiments, the computer program product or the computer program, when running on an electronic device, enables the electronic device to perform the following steps:

sending a request for playing the first video to the server in response to receipt of the play instruction for the first video; and receiving the first video and the first plot prompt message corresponding to the first video.

In some embodiments, the computer program product or the computer program, when running on an electronic device, enables the electronic device to perform the following step:

displaying a second plot development selection interface in response to end of playing of the second video, wherein the second plot development selection interface includes a second plot prompt message including a plurality of prompt messages, each prompt message corresponding to a plot development direction of the second video.

In some embodiments, the first plot development selection interface further includes a title message corresponding to the first video, and the second plot development selection interface further includes a title message corresponding to the second video.

In some embodiments, all or part of the above embodiments are implemented by software, hardware, firmware, or any combination thereof. When implemented by the software, all or part of above embodiments are implemented in the form of a computer program product. The computer program product includes one or more computer instructions. When the computer program instructions are loaded and executed on the computer, all or part of the processes or functions according to the embodiments of the present disclosure are generated. In some embodiments, the computer is a general computer, a special computer, a computer network, or other programmable devices. In some embodiments, the computer instructions are stored in a computer-readable storage medium or transferred from one computer-readable storage medium to another computer-readable storage medium. For example, the computer instructions can be transferred from a website site, computer, server or data center to another website site, computer, server or data center in a wired fashion, such as a coaxial cable, an optical fiber, or a digital subscriber line (DSL); or in a wireless fashion, such as infrared transmission, wireless transmission, or microwave transmission. In some embodiments, the computer-readable storage medium is any available medium that can be accessed by the computer or a data storage device such as a server or a data center including and integrated by one or more available mediums. In some embodiments, the available medium is a magnetic medium, such as a floppy disk, a hard disk and a magnetic tape, an optical medium, for example, DVD, a semiconductor medium, for example, a solid state disk (SSD), or the like.

It should be noted that, as used herein, relation terms such as "first" and "second" are used merely to distinguish a subject or an operation from another subject or another operation, and not to imply any substantial relation or order between these subjects or operations. Moreover, the terms "include", "contain", "comprise" or any variations thereof are intended to cover an nonexclusive containing meaning, such that a process, a method, an item or a device containing a series of elements not only includes these elements, but also includes other elements that are not set forth specifically, or also includes an inherent element of such a process, method, item or device. Without more limitations, the element defined by the phrase "including a . . . " does not exclude the presence of additional equivalent elements in the process, method, item, or device that includes the element.

The various embodiments in the specification are described in a progressive manner, the same or similar parts between the various embodiments may be referred to each other, and each embodiment focuses on the differences from the other embodiments. In particular, for the apparatus embodiment, since it is basically similar to the method embodiment, the description is relatively simple, and the relevant parts may be referred to the description of the method embodiment.

Described above are merely preferred embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for playing a video, comprising:
    displaying a video production interface, wherein the video production interface comprises a video editing area, the video editing area comprises a video editing function selection area and a special control;
    obtaining a first video that is inserted by the video editing function selection area;
    displaying the first video on the video editing area;
    displaying a plot development setting interface of the first video in response to a tap operation on the special control, wherein the plot development setting interface comprises the video editing area and a plot development selection window, and the plot development selection window is displayed in an upper layer of the video editing area;
    receiving a title message corresponding to the first video, a second video and a target prompt message corresponding to the second video that are inserted in the plot development selection window, the target prompt message being a title message of the second video;
    establishing a corresponding relationship between the first video and the target prompt message;
    establishing a corresponding relationship between the second video and the target prompt message;
    uploading the first video, the target prompt message, the second video, the corresponding relationship between the first video and the target prompt message and the corresponding relationship between the target prompt message and the second video to a server;
    sending a request for playing the first video to the server in response to receipt of a play instruction for the first video;
    receiving the first video and the first plot prompt message corresponding to the first video, wherein the first plot prompt message comprises the target prompt message;
    playing the first video;
    displaying the target prompt message on a first plot development selection interface of the first video in the form of a button in response to end of playing of the first video; and
    sending an identifier carried by the target prompt message to the server, and playing the second video sent by the server in response to the button being selected, wherein the server is configured to determine the second video corresponding to the target prompt message according to the identifier and the stored corresponding relationship between the second video and the target prompt message.

2. The method according to claim 1, wherein the plot development selection window comprises a video insert button and a prompt message insert button;
wherein the video insert button is configured to insert the second video corresponding to the target prompt message; and
the prompt message insert button is configured to insert the target prompt message.

3. The method according to claim 2, wherein the plot development selection window further comprises a title insert button, and the title insert button is configured to insert the title message corresponding to the first video.

4. The method according to claim 1, further comprising:
displaying a second plot development selection interface in response to end of playing of the second video, wherein the second plot development selection interface comprises a second plot prompt message comprising a plurality of prompt messages, each prompt message corresponding to a plot development direction of the second video.

5. The method according to claim 4, wherein the first plot development selection interface further comprises a title message corresponding to the first video, and the second plot development selection interface further comprises a title message corresponding to the second video.

6. An electronic device comprising a processor, a communication interface, a memory, and a communication bus;
wherein the processor, the communication interface, and the memory communicate with each other by the communication bus; and
wherein the memory is configured to store a computer program;
wherein the computer program, when executed by the processor, causes the processor to perform a method comprising:
displaying a video production interface, wherein the video production interface comprises a video editing area, the video editing area comprises a video editing function selection area and a special control;
obtaining a first video that is inserted by the video editing function selection area;
displaying the first video on the video editing area;
displaying a plot development setting interface of the first video in response to a tap operation on the special control, wherein the plot development setting interface comprises the video editing area and a plot development selection window, and the plot development selection window is displayed in an upper layer of the video editing area;
receiving a title message corresponding to the first video, a second video and a target prompt message corresponding to the second video that are inserted in the plot development selection window, the target prompt message being a title message of the second video;
establishing a corresponding relationship between the first video and the target prompt message;
establishing a corresponding relationship between the second video and the target prompt message;
uploading the first video, the target prompt message, the second video, the corresponding relationship between the first video and the target prompt message, and the corresponding relationship between the target prompt message and the second video to a server;
sending a request for playing the first video to the server in response to receipt of a play instruction for the first video;
receiving the first video and the first plot prompt message corresponding to the first video, wherein the first plot prompt message comprises the target prompt message;
playing the first video;
displaying the target prompt message on a first plot development selection interface of the first video in the form of a button in response to end of playing of the first video; and
sending an identifier carried by the target prompt message to the server, and playing the second video sent by the server in response to the button being selected, wherein the server is configured to determine the second video corresponding to the target prompt message according to the identifier and the stored corresponding relationship between the second video and the target prompt message.

7. The electronic device according to claim 6, wherein the plot development selection window comprising a video insert button and a prompt message insert button;
wherein the video insert button is configured to insert the second video corresponding to the target prompt message; and
the prompt message insert button is configured to insert the target prompt message.

8. The electronic device according to claim 7, wherein the plot development selection window further comprises a title insert button, and the title insert button is configured to insert the title message corresponding to the first video.

9. The electronic device according to claim 6, wherein the processor, when running the computer program, is enabled to perform the following step:
displaying a second plot development selection interface in response to end of playing of the second video; wherein the second plot development selection comprises a second plot prompt message, the second plot prompt message comprising a plurality of prompt messages, each prompt message corresponding to a plot development direction of the second video.

10. The electronic device according to claim 9, wherein the first plot development selection interface further comprises a title message corresponding to the first video, and the second plot development selection interface further comprises a title message corresponding to the second video.

11. A non-transitory computer-readable storage medium, wherein a computer program is stored in the non-transitory computer-readable storage medium;
wherein the computer program, when executed by a processor, causes the processor to perform a method comprising:
displaying a video production interface, wherein the video production interface comprises a video editing area, the video editing area comprises a video editing function selection are and a special control;
obtaining a first video that is inserted by the video editing function selection area;
displaying the first video on the video editing area;
displaying a plot development setting interface of the first video in response to a tap operation on the special control, wherein the plot development setting interface comprises the video editing area and a plot development selection window, and the plot development selection window is displayed in an upper layer of the video editing area;

receiving a title message corresponding to the first video, a second video and a target prompt message corresponding to the second video that are inserted in the plot development selection window, the target prompt message being a title message of the second video;

establishing a corresponding relationship between the first video and the target prompt message;

establishing a corresponding relationship between the second video and the target prompt message;

uploading the first video, the target prompt message, the second video, the corresponding relationship between the first video and the target prompt message, and the corresponding relationship between the target prompt message and the second video to a server;

sending a request for playing the first video to the server in response to receipt of a play instruction for the first video;

receiving the first video and the first plot prompt message corresponding to the first video, wherein the first plot prompt message comprises the target prompt message;

playing the first video;

displaying the target prompt message on a first plot development selection interface of the first video in the form of a button in response to end of playing of the first video; and sending an identifier carried by the target prompt message to the server, and playing the second video sent by the server in response to the button being selected, wherein the server is configured to determine the second video corresponding to the target prompt message according to the identifier and the stored corresponding relationship between the second video and the target prompt message.

* * * * *